US011785635B2

(12) United States Patent
Rost et al.

(10) Patent No.: US 11,785,635 B2
(45) Date of Patent: Oct. 10, 2023

(54) COMMUNICATION SYSTEM ENABLED TO MINIMIZE NEGATIVE COMMUNICATION EFFECTS

(71) Applicant: Nokia Solutions and Networks GmbH & Co. KG, Munich (DE)

(72) Inventors: Peter Rost, Heidelberg (DE); Borislava Gajic, Unterhaching (DE); Rakash Sivasiva Ganesan, Unterhaching (DE); Christian Mannweiler, Munich (DE)

(73) Assignee: Nokia Technologies Oy, Espoo (FI)

( * ) Notice: Subject to any disclaimer, the term of this patent is extended or adjusted under 35 U.S.C. 154(b) by 167 days.

(21) Appl. No.: 17/083,390

(22) Filed: Oct. 29, 2020

(65) Prior Publication Data
US 2021/0144733 A1  May 13, 2021

(30) Foreign Application Priority Data

Nov. 7, 2019 (EP) .................................. 19207658

(51) Int. Cl.
*H04W 72/566* (2023.01)
*H04W 72/0446* (2023.01)
*H04W 72/1268* (2023.01)
*H04W 72/23* (2023.01)

(52) U.S. Cl.
CPC ..... *H04W 72/569* (2023.01); *H04W 72/0446* (2013.01); *H04W 72/1268* (2013.01); *H04W 72/23* (2023.01)

(58) Field of Classification Search
CPC ......... H04W 72/1242; H04W 72/0446; H04W 72/1268; H04W 72/14; H04L 47/24
See application file for complete search history.

(56) References Cited

U.S. PATENT DOCUMENTS

| 2007/0115848 | A1* | 5/2007 | Chean | H04L 47/10 370/252 |
| 2009/0010205 | A1* | 1/2009 | Pratt, Jr. | H04W 56/0015 370/328 |
| 2011/0116460 | A1* | 5/2011 | Kowali | H04L 47/621 370/329 |
| 2011/0286465 | A1* | 11/2011 | Koodli | H04W 68/00 370/401 |
| 2013/0290537 | A1* | 10/2013 | Shaw | H04W 28/0861 709/226 |

(Continued)

FOREIGN PATENT DOCUMENTS

| CN | 106507492 A | * | 3/2017 | ........ H04W 72/1242 |
| EP | 3522459 A1 | * | 8/2019 | ............ H04L 12/66 |

(Continued)

*Primary Examiner* — Jael M Ulysse
(74) *Attorney, Agent, or Firm* — Harrington & Smith

(57) ABSTRACT

There is provided a method for a core network apparatus, the method including receiving data units from at least one network access apparatus, wherein each data unit is labelled with a respective priority level; and withholding from transmitting a data unit labelled with a relatively low priority level in accordance with a predetermined schedule, wherein the predetermined schedule is dependent on a slot timing for data arriving at the at least one network access apparatus for communication upstream and a predetermined delay time in forwarding the data from the at least one network access apparatus to the core network apparatus.

20 Claims, 6 Drawing Sheets

(56) References Cited

U.S. PATENT DOCUMENTS

| | | | |
|---|---|---|---|
| 2016/0112896 A1* | 4/2016 | Karampatsis | H04W 28/0289 |
| | | | 370/230.1 |
| 2016/0113025 A1* | 4/2016 | Shaw | H04W 4/70 |
| | | | 455/450 |
| 2017/0155590 A1* | 6/2017 | Dillon | H04L 43/0852 |
| 2018/0123950 A1* | 5/2018 | Garg | H04L 47/22 |
| 2018/0343206 A1* | 11/2018 | White | H04L 47/11 |
| 2019/0098644 A1* | 3/2019 | Loehr | H04W 72/569 |
| 2019/0253918 A1* | 8/2019 | Liu | H04W 40/06 |
| 2019/0289616 A1* | 9/2019 | Hampel | H04W 72/56 |
| 2020/0053018 A1* | 2/2020 | White | H04L 47/11 |
| 2020/0177517 A1* | 6/2020 | Pancras | H04W 4/80 |
| 2020/0336263 A1* | 10/2020 | Halepovic | H04L 47/822 |
| 2021/0045024 A1* | 2/2021 | Hett | H04W 72/56 |
| 2021/0352521 A1* | 11/2021 | Pan | H04L 47/24 |
| 2022/0132530 A1* | 4/2022 | Bhamri | H04L 5/003 |

FOREIGN PATENT DOCUMENTS

| | | | | |
|---|---|---|---|---|
| WO | WO-2015153589 A1 * | 10/2015 | | H04W 28/0215 |
| WO | WO-2019105095 A1 * | 6/2019 | | H04W 24/02 |
| WO | WO 2019/149063 A1 | 8/2019 | | |
| WO | WO-2019149063 A1 * | 8/2019 | | H04L 43/026 |
| WO | WO-2019184807 A1 * | 10/2019 | | H04W 28/16 |

* cited by examiner

COMMUNICATION SYSTEM ENABLED TO MINIMIZE NEGATIVE COMMUNICATION EFFECTS

FIELD

The present application relates to a method, apparatus, and computer program.

BACKGROUND

A communication system can be seen as a facility that enables communication sessions between two or more entities such as user terminals, base stations/access nodes and/or other nodes by providing carriers between the various entities involved in the communications path. A communication system can be provided, for example, by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

SUMMARY

According to a first aspect, there is provided a core network apparatus comprising: means for receiving data units from at least one network access apparatus, wherein each data unit is labelled with a respective priority level; and means for withholding from transmitting a data unit labelled with a relatively low priority level in accordance with a predetermined schedule, wherein the predetermined schedule is dependent on a slot timing for data arriving at the at least one network access apparatus for communication upstream and a predetermined delay time in forwarding the data from the at least one network access apparatus to the core network apparatus.

The core network apparatus may comprise means for receiving the predetermined schedule from a control plane function. The control plane function may be a Session Management Function.

The predetermined delay time may comprise a fixed processing time of the at least one network access apparatus for processing an uplink transmission of the received data.

The predetermined delay time may comprise a transmission latency time representing a transmission delay between the core network apparatus and the at least one network access apparatus, and a delay time representing a time between when a data unit is received by the core network apparatus and when the data unit is forwarded to an egress port of the core network apparatus.

The core network apparatus may comprise means for determining the schedule in dependence on a configured uplink grant of at least one network access apparatus for transmitting high priority data from a terminal to said at least one network access apparatus.

The core network apparatus may comprise means for transmitting a data unit labelled with a relatively high priority level simultaneous to withholding from transmitting said data unit labelled with a relatively low priority level in accordance with the predetermined schedule.

The slot timing may be based on a global timing employed by the at least one network access apparatus.

The means for withholding may withhold transmitting said data unit for a predetermined length of time, and wherein the core network apparatus further comprises means for, when no high priority data is received by the core network apparatus within the predetermined length of time, transmitting said data unit immediately after the predetermined length of time has passed.

The means for withholding may withhold transmitting said data unit for a predetermined length of time, and wherein the core network apparatus further comprises means for, when high priority data is received by the core network apparatus within the predetermined length of time, continuing to withhold transmitting said data unit. This continuing to withhold may be until at after at least part of the high priority data has been transmitted upstream by the core network apparatus.

According to a second aspect, there is provided a network apparatus comprising: means for determining a predetermined schedule for a core network apparatus for withholding from transmitting a data unit labelled with a relatively low priority level, wherein the predetermined schedule is dependent on a slot timing for data arriving at least one network access apparatus for communication upstream and a predetermined delay time in forwarding the data from the at least one network access apparatus to the core network apparatus; and means for providing the predetermined schedule to the core network apparatus.

The predetermined schedule may be dependent on a fixed processing time of the at least one network access apparatus in preparing received data for an uplink transmission.

The predetermined schedule may be dependent on a transmission latency time representing a transmission delay between the core network apparatus and the at least one network access apparatus, and a delay time representing a time between when a data unit is received by the core network apparatus and when the data unit is forwarded to an egress port of the core network apparatus.

The network apparatus may comprise means for determining the schedule in dependence on a configured uplink grant of at least one network access apparatus for transmitting high priority data from a terminal to said at least one network access apparatus.

The slot timing may be based on a global timing employed by the at least one network access apparatus.

According to a third aspect, there is provided a core network apparatus comprising: at least one processor, and at least one memory comprising computer code that, when run on the at least one processor, causes the core network apparatus to: receive data units from at least one network access apparatus, wherein each data unit is labelled with a respective priority level; and withhold from transmitting a data unit labelled with a relatively low priority level in accordance with a predetermined schedule, wherein the predetermined schedule is dependent on a slot timing for data arriving at the at least one network access apparatus for communication upstream and a predetermined delay time in forwarding the data from the at least one network access apparatus to the core network apparatus.

The core network apparatus may be caused to receive the predetermined schedule from a control plane function. The control plane function may be a Session Management Function.

The predetermined delay time may comprise a fixed processing time of the at least one network access apparatus for processing an uplink transmission of the received data.

The predetermined delay time may comprise a transmission latency time representing a transmission delay between the core network apparatus and the at least one network access apparatus, and a delay time representing a time between when a data unit is received by the core network apparatus and when the data unit is forwarded to an egress port of the core network apparatus.

The core network apparatus may be caused to determine the schedule in dependence on a configured uplink grant of at least one network access apparatus for transmitting high priority data from a terminal to said at least one network access apparatus.

The core network apparatus may be caused to transmit a data unit labelled with a relatively high priority level simultaneous to withholding from transmitting said data unit labelled with a relatively low priority level in accordance with the predetermined schedule.

The slot timing may be based on a global timing employed by the at least one network access apparatus.

The core network apparatus may be caused to withhold by withholding transmitting said data unit for a predetermined length of time, and wherein the core network apparatus is further caused to, when no high priority data is received by the core network apparatus within the predetermined length of time, transmitting said data unit immediately after the predetermined length of time has passed.

The core network apparatus may be caused to withhold by withholding transmitting said data unit for a predetermined length of time, and wherein the core network apparatus is further caused to, when high priority data is received by the core network apparatus within the predetermined length of time, continuing to withhold transmitting said data unit. This continuing to withhold may be until at after at least part of the high priority data has been transmitted upstream by the core network apparatus.

According to a fourth aspect, there is provided a network apparatus comprising: at least one processor, and at least one memory comprising computer code that, when run on the at least one processor, causes the core network apparatus to: determine a predetermined schedule for a core network apparatus for withholding from transmitting a data unit labelled with a relatively low priority level, wherein the predetermined schedule is dependent on a slot timing for data arriving at least one network access apparatus for communication upstream and a predetermined delay time in forwarding the data from the at least one network access apparatus to the core network apparatus; and provide the predetermined schedule to the core network apparatus.

The predetermined schedule may be dependent on a fixed processing time of the at least one network access apparatus in preparing received data for an uplink transmission.

The predetermined schedule may be dependent on a transmission latency time representing a transmission delay between the core network apparatus and the at least one network access apparatus, and a delay time representing a time between when a data unit is received by the core network apparatus and when the data unit is forwarded to an egress port of the core network apparatus.

The network apparatus may be caused to determine the schedule in dependence on a configured uplink grant of at least one network access apparatus for transmitting high priority data from a terminal to said at least one network access apparatus.

The slot timing may be based on a global timing employed by the at least one network access apparatus.

According to a fifth aspect, there is provided a method for a core network apparatus, the method comprising: receiving data units from at least one network access apparatus, wherein each data unit is labelled with a respective priority level; and withholding from transmitting a data unit labelled with a relatively low priority level in accordance with a predetermined schedule, wherein the predetermined schedule is dependent on a slot timing for data arriving at the at least one network access apparatus for communication upstream and a predetermined delay time in forwarding the data from the at least one network access apparatus to the core network apparatus.

The method may comprise receiving the predetermined schedule from a control plane function. The control plane function may be a Session Management Function.

The predetermined delay time may comprise a fixed processing time of the at least one network access apparatus for processing an uplink transmission of the received data.

The predetermined delay time may comprise a transmission latency time representing a transmission delay between the core network apparatus and the at least one network access apparatus, and a delay time representing a time between when a data unit is received by the core network apparatus and when the data unit is forwarded to an egress port of the core network apparatus.

The method may comprise determining the schedule in dependence on a configured uplink grant of at least one network access apparatus for transmitting high priority data from a terminal to said at least one network access apparatus.

The method may comprise transmitting a data unit labelled with a relatively high priority level simultaneous to withholding from transmitting said data unit labelled with a relatively low priority level in accordance with the predetermined schedule.

The slot timing may be based on a global timing employed by the at least one network access apparatus.

The withholding may withhold transmitting said data unit for a predetermined length of time, and wherein the method comprises, when no high priority data is received by the core network apparatus within the predetermined length of time, transmitting said data unit immediately after the predetermined length of time has passed.

The withholding may withhold transmitting said data unit for a predetermined length of time, and wherein the method comprises, when high priority data is received by the core network apparatus within the predetermined length of time, continuing to withhold transmitting said data unit. This continuing to withhold may be until at after at least part of the high priority data has been transmitted upstream by the core network apparatus.

According to a sixth aspect, there is provided a method for a network apparatus, the method comprising: determining a predetermined schedule for a core network apparatus for withholding from transmitting a data unit labelled with a relatively low priority level, wherein the predetermined schedule is dependent on a slot timing for data arriving at least one network access apparatus for communication upstream and predetermined delay time in forwarding the data from the at least one network access apparatus to the core network apparatus; and providing the predetermined schedule to the core network apparatus.

The predetermined schedule may be dependent on a fixed processing time of the at least one network access apparatus in preparing received data for an uplink transmission.

The predetermined schedule may be dependent on a transmission latency time representing a transmission delay between the core network apparatus and the at least one network access apparatus, and a delay time representing a time between when a data unit is received by the core network apparatus and when the data unit is forwarded to an egress port of the core network apparatus.

The method may comprise determining the schedule in dependence on a configured uplink grant of at least one network access apparatus for transmitting high priority data from a terminal to said at least one network access apparatus.

The slot timing may be based on a global timing employed by the at least one network access apparatus.

According to a seventh aspect, there is provided a core network apparatus comprising: receiving circuitry for receiving data units from at least one network access apparatus, wherein each data unit is labelled with a respective priority level; and withholding circuitry for withholding from transmitting a data unit labelled with a relatively low priority level in accordance with a predetermined schedule, wherein the predetermined schedule is dependent on a slot timing for data arriving at the at least one network access apparatus for communication upstream and a predetermined delay time in forwarding the data from the at least one network access apparatus to the core network apparatus.

The core network apparatus may comprise receiving circuitry for receiving the predetermined schedule from a control plane function. The control plane function may be a Session Management Function.

The predetermined delay time may comprise a fixed processing time of the at least one network access apparatus for processing an uplink transmission of the received data.

The predetermined delay time may comprise a transmission latency time representing a transmission delay between the core network apparatus and the at least one network access apparatus, and a delay time representing a time between when a data unit is received by the core network apparatus and when the data unit is forwarded to an egress port of the core network apparatus.

The core network apparatus may determining circuitry for determining the schedule in dependence on a configured uplink grant of at least one network access apparatus for transmitting high priority data from a terminal to said at least one network access apparatus.

The core network apparatus may comprise transmitting circuitry for transmitting a data unit labelled with a relatively high priority level simultaneous to withholding from transmitting said data unit labelled with a relatively low priority level in accordance with the predetermined schedule.

The slot timing may be based on a global timing employed by the at least one network access apparatus.

The withholding circuitry may withhold transmitting said data unit for a predetermined length of time, and wherein the core network apparatus further comprises transmitting circuitry for, when no high priority data is received by the core network apparatus within the predetermined length of time, transmitting said data unit immediately after the predetermined length of time has passed.

The withholding circuitry may withhold transmitting said data unit for a predetermined length of time, and wherein the core network apparatus further comprises transmitting circuitry for, when high priority data is received by the core network apparatus within the predetermined length of time, continuing to withhold transmitting said data unit. This continuing to withhold may be until at after at least part of the high priority data has been transmitted upstream by the core network apparatus.

According to an eighth aspect, there is provided a network apparatus comprising: determining circuitry for determining a predetermined schedule for a core network apparatus for withholding from transmitting a data unit labelled with a relatively low priority level, wherein the predetermined schedule is dependent on a slot timing for data arriving at least one network access apparatus for communication upstream and a predetermined delay time in forwarding the data from the at least one network access apparatus to the core network apparatus; and providing circuitry for providing the predetermined schedule to the core network apparatus.

The predetermined schedule may be dependent on a fixed processing time of the at least one network access apparatus in preparing received data for an uplink transmission.

The predetermined schedule may be dependent on a transmission latency time representing a transmission delay between the core network apparatus and the at least one network access apparatus, and a delay time representing a time between when a data unit is received by the core network apparatus and when the data unit is forwarded to an egress port of the core network apparatus.

The network apparatus may comprise determining circuitry for determining the schedule in dependence on a configured uplink grant of at least one network access apparatus for transmitting high priority data from a terminal to said at least one network access apparatus.

The slot timing may be based on a global timing employed by the at least one network access apparatus.

According to a ninth aspect, there is provided a computer program comprising program instructions for causing a computer to perform any method as described above.

According to a tenth aspect, there is provided a computer program product stored on a medium may cause an apparatus to perform any method as described herein.

According to an eleventh aspect, there is provided an electronic device that may comprise apparatus as described herein.

According to a twelfth aspect, there is provided a chipset that may comprise an apparatus as described herein.

According to a thirteenth aspect, there is provided non-transitory computer readable medium comprising program instructions for causing an apparatus for a core network apparatus to perform at least the following: receive data units from at least one network access apparatus, wherein each data unit is labelled with a respective priority level; and withhold from transmitting a data unit labelled with a relatively low priority level in accordance with a predetermined schedule, wherein the predetermined schedule is dependent on a slot timing for data arriving at the at least one network access apparatus for communication upstream and a predetermined delay time in forwarding the data from the at least one network access apparatus to the core network apparatus.

The apparatus may be caused to receive the predetermined schedule from a control plane function. The control plane function may be a Session Management Function.

The predetermined delay time may comprise a fixed processing time of the at least one network access apparatus for processing an uplink transmission of the received data.

The predetermined delay time may comprise a transmission latency time representing a transmission delay between the core network apparatus and the at least one network access apparatus, and a delay time representing a time between when a data unit is received by the core network apparatus and when the data unit is forwarded to an egress port of the core network apparatus.

The apparatus may be caused to determine the schedule in dependence on a configured uplink grant of at least one network access apparatus for transmitting high priority data from a terminal to said at least one network access apparatus.

The apparatus may be caused to transmit a data unit labelled with a relatively high priority level simultaneous to withholding from transmitting said data unit labelled with a relatively low priority level in accordance with the predetermined schedule.

The slot timing may be based on a global timing employed by the at least one network access apparatus.

The apparatus may be caused to withhold by withholding transmitting said data unit for a predetermined length of time, and wherein the apparatus is further caused to, when no high priority data is received by the core network apparatus within the predetermined length of time, transmitting said data unit immediately after the predetermined length of time has passed.

The apparatus may be caused to withhold by withholding transmitting said data unit for a predetermined length of time, and wherein the apparatus is further caused to, when high priority data is received by the core network apparatus within the predetermined length of time, continuing to withhold transmitting said data unit. This continuing to withhold may be until at after at least part of the high priority data has been transmitted upstream by the core network apparatus.

According to a fourteenth aspect, there is provided non-transitory computer readable medium comprising program instructions for causing an apparatus for a network apparatus to perform at least the following: determine a predetermined schedule for a core network apparatus for withholding from transmitting a data unit labelled with a relatively low priority level, wherein the predetermined schedule is dependent on a slot timing for data arriving at least one network access apparatus for communication upstream and a predetermined delay time in forwarding the data from the at least one network access apparatus to the core network apparatus; and provide the predetermined schedule to the core network apparatus.

The predetermined schedule may be dependent on a fixed processing time of the at least one network access apparatus in preparing received data for an uplink transmission.

The predetermined schedule may be dependent on a transmission latency time representing a transmission delay between the core network apparatus and the at least one network access apparatus, and a delay time representing a time between when a data unit is received by the core network apparatus and when the data unit is forwarded to an egress port of the core network apparatus.

The apparatus may be caused to determine the schedule in dependence on a configured uplink grant of at least one network access apparatus for transmitting high priority data from a terminal to said at least one network access apparatus.

The slot timing may be based on a global timing employed by the at least one network access apparatus.

DESCRIPTION OF FIGURES

Examples will now be described, by way of example only, with reference to the accompanying Figures in which.

DETAILED DESCRIPTION

In general, the following disclosure relates to mechanisms for prioritising the transmission of higher priority frames in a network over lower priority frames.

The described mechanisms have particular relevance to prioritising the transmission of data link level frames, such as Ethernet.

Further features of this system are discussed below in examples.

Before explaining in detail the examples, certain general principles of a wireless communication system and mobile communication devices are briefly explained with reference to FIGS. 1 to 2 to assist in understanding the technology underlying the described examples.

Figure 1:
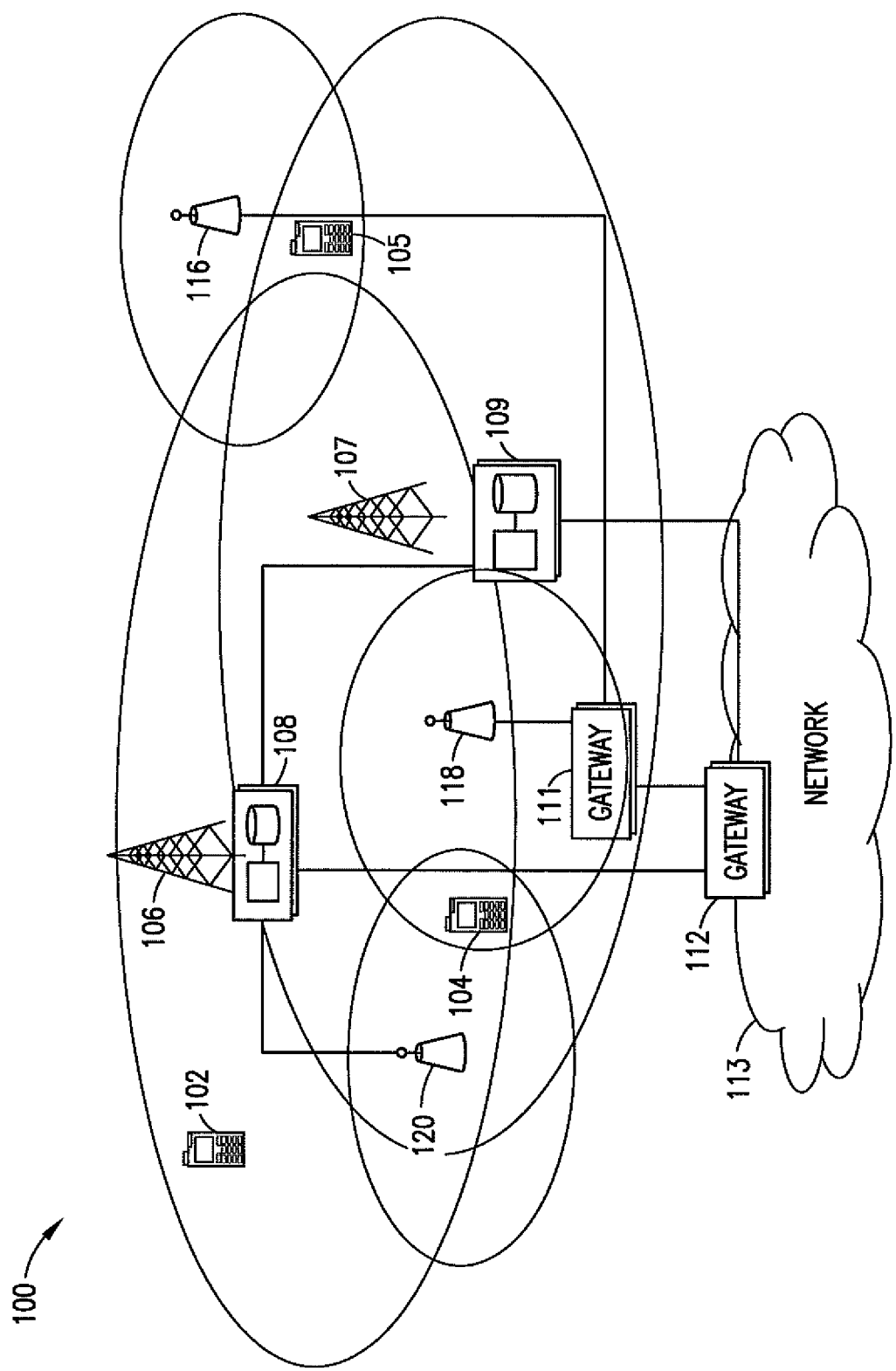
FIG. 1 shows a schematic diagram of an example communication system comprising a plurality of base stations and a plurality of communication devices.

In a wireless communication system 100, such as that shown in FIG. 1, mobile communication devices, user apparatus, or terminal 102, 104, 105 are provided wireless access via at least one base station or similar wireless transmitting and/or receiving node or point. A user can access the communication system by means of an appropriate communication device or terminal. A communication device of a user is often referred to as user equipment (UE) or as a user apparatus. Throughout the following, these terms will be used interchangeably. It is understood that the term "terminal" is used to cover communication devices that may access a network through an access node, and which may or may not have a user. Examples of such terminals without a user include devices that make machine-to-machine transmissions in a factory. A communication device is provided with an appropriate signal receiving and transmitting apparatus for enabling communications, for example enabling access to a communication network or communications directly with other users. The communication device may access a carrier provided by a station or access node, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). An example of attempts to solve the problems associated with the increased demands for capacity is an architecture that is known as the long-term evolution (LTE) of the Universal Mobile Telecommunications System (UMTS) radio-access technology. The LTE standard is developed by the 3rd Generation Partnership Project (3GPP). LTE was first released in 2008 (known as LTE Release 8), and new enhancements (in form of releases) has been introduced since then. LTE Release 13 and onwards is also known as LTE Advanced Pro. Another example of communications system is New Radio (NR), which is the latest 3GPP development.

A base station is referred to as an eNodeB (eNB) in LTE and as a gNodeB (gNB), and may be referred to more generally as simply a network apparatus or a network access node. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. In some systems, the control apparatus may additionally or alternatively be provided in a radio network controller.

3GPP systems may however be considered to have a so-called "flat" architecture, without the provision of RNCs; rather the (e)/(g)NB is in communication with a system architecture evolution gateway (SAE-GW) and a mobility management entity (MME), which entities may also be pooled meaning that a plurality of these nodes may serve a plurality (set) of (e)/(g)NBs. Each user apparatus is served by only one MME and/or S-GW at a time and the (e)/(g)NB keeps track of current association. SAE-GW is a "high-level" user plane core network element in LTE, which may comprise the S-GW and the P-GW (serving gateway and packet data network gateway, respectively). The functionalities of the S-GW and P-GW are separated, and they are not required to be co-located.

In a 3GPP system, radio resource control (RRC) is defined to be a sublayer of radio interface Layer 3 that exists in the control plane only, and which provides information transfer service to the non-access stratum (an example is provided in 3GPP Technical Specification Group Services and System Aspects 21.905). RRC is a protocol layer between a user apparatus and a base station, and is in charge of, for example, paging the user apparatus when traffic comes, establishing/maintaining or release of radio bearers (establishing an RRC connection between user apparatus and (e)/(g)NB), user apparatus mobility, user apparatus measurement configuration and user apparatus reporting configuration, etc. RRC is responsible for controlling the configuration of radio interface Layers 1 and 2.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, base stations 116 and 118 are connected via a gateway 111 whilst station 120 connects via the controller apparatus 108. In some examples, the smaller stations may not be provided. It is understood that this is just an example communication system, and other network structures may be defined by an operating communication protocol.

Figure 2:
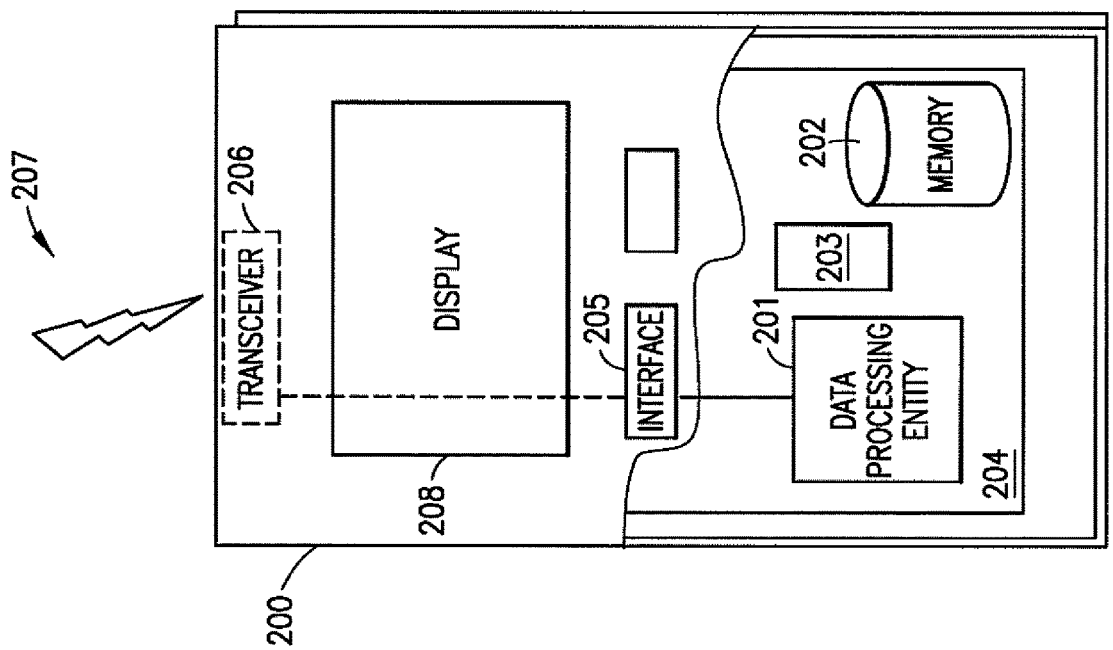
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user apparatus (terminal) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto. The communication devices 102, 104, 105 may access the communication system based on various access techniques.

An example of wireless communication systems are architectures standardized by the 3rd Generation Partnership Project (3GPP). A latest 3GPP based development is often referred to as the 5th Generation (5G) New Radio (NR). Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area.

Figure 3:
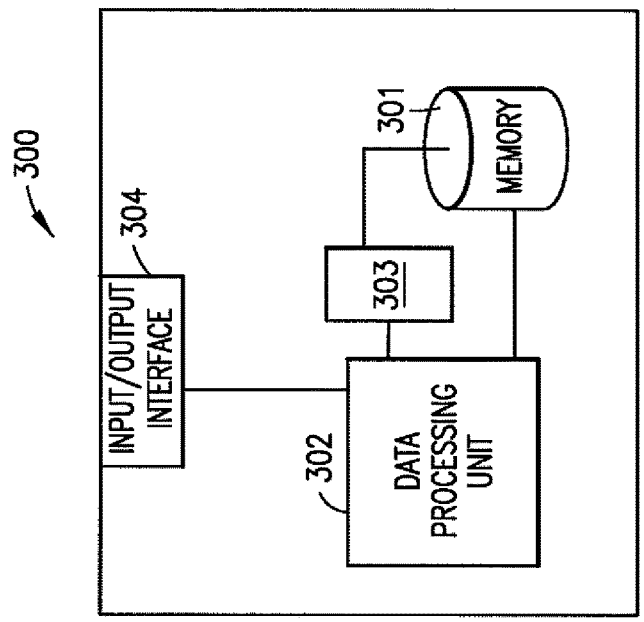
FIG. 3 shows a schematic diagram of an example network element.

An example network equipment for the 3GPP system is shown in FIG. 3. FIG. 3 shows an example of a control apparatus 300 for a communication system, for example to be coupled to and/or for controlling a station of an access system, such as a radio access network node, e.g. a base station or (g) node B, or a node of a core network such as an MME or Access and Mobility Management Function (AMF). The method may be implanted in a single control apparatus or across more than one control apparatus. The control apparatus may be integrated with or external to a node or module of a core network or radio access network. In some examples, base stations comprise a separate control apparatus unit or module. In other examples, the control apparatus can be another network element such as a radio network controller or a spectrum controller. In some examples, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example, the control apparatus 300 can be configured to execute an appropriate software code to provide the control functions. Control apparatus 300 may be included in a chipset or modem apparatus. A chipset or modem apparatus which includes apparatus 300 may be included in a control node such as a gNB.

The 5$^{th}$ generation (5G) cellular network may comprise at least one network bridge. A network bridge is a networking device that creates a single aggregate network from multiple communication networks or network segments. This means that when a bridge is implemented between two separate/distinct networks, which may have their own respective communication protocols for communicating data, each network treats the other network as though they're both operating according to the same communication protocols. Bridges may be implemented at a data link layer. The operation of a specific bridge may be defined in terms of its general principles, and/or with reference to a specific operating protocol.

For example, one type of bridging mechanism is called transparent bridging. Under transparent bridging, a bridge uses a forwarding table to control the forwarding of frames between networks/network segments. This means that once a bridge has learnt/obtained the addresses of its connected nodes, it may forward data link layer frames using a layer-2 forwarding method (some error checking on the frames may be performed (or not performed) on the data frames prior to forwarding, depending on the bridge being implemented).

Another type of bridging mechanism is a "shortest path bridging", which is specified in the IEEE 802.1aq standard and may utilise multipath routing.

A bridged network as standardized by the IEEE 802.1 protocol series (which includes IEEE 802.1aq) is configured to provide different mechanisms for traffic differentiation and quality of service guarantees. For example, an IEEE 802.1D compliant bridge is configured to forward frames from ingress to egress ports based on filtering databases, which are usually learned by observing incoming frames and recording their source addresses. In such a case, it may happen that best effort traffic leads to congestion at a bridge by filling an egress queue. This would also likely lead to higher latencies for critical/time-sensitive traffic.

The IEEE 802.1Q-2018 standard defines bridges that may interconnect local area networks (LANs). This standard incorporates multiple amendments relevant to IEEE Time Sensitive Networks, such as IEEE 802.1Qbv, IEEE 802.1Qbu, IEEE 802.1Qci, and IEEE 802.1P.

In order to be able to differentiate between (and consequently prioritize traffic), the IEEE 802.1Q protocol may be applied. This protocol uses/introduces a Priority Code Point (PCP) that uses eight PCP values that respectively correspond to eight different classes of service to represent different types/prioritisations of traffic. Each traffic class represents a unique queue per egress port. These eight different traffic classes may include, from lowest priority to highest priority, background traffic, best effort traffic, excellent effort traffic, critical applications traffic, video traffic (<100 ms latency and jitter), voice traffic (<10 ms latency and jitter), Internetwork control traffic and network control traffic. A value reflecting/indicating the priority of a particular frame may be included in a three-bit PCP field in a header added to the frame. In the above example, best effort traffic is assigned PCP 1 while network control traffic is assigned PCP 7. In this case, best effort traffic would only cause a congestion of the queue assigned to PCP 1 while the queue assigned to PCP 7 is not congested by best effort traffic. The term "Head of Line Blocking" is used to refer to the situation in which a low-priority frame that is currently being transmitted on an egress port is blocking the transmission of a higher-priority frame that is supposed to be transmitted on the same egress port.

However, because Ethernet (which is defined by the IEEE 802.3 set of protocols) applies a time-division multiple access, it may happen that at the time when an Ethernet frame with network control traffic (PCP 7) is ready to be transmitted on an egress port, the corresponding egress port may still be transmitting a PCP 1 frame (or other lower priority frames, such as PCP 4 frames). In this case, the PCP 7 frame has to wait until the PCP 1 has been transmitted and the PCP 7 frame can be transmitted. The waiting time depends on the line speed and the size of the largest protocol data unit (PDU) that can be communicated in a single network layer transaction (termed a Maximum Transmission Unit (MTU)). Assuming a network comprising 100 Mbps Ethernet links and an MTU of 1500 byte, the maximum waiting time would be around 125 μs. In current networks, this maximum waiting time is accounted for using safety margins in the end-to-end latency budget.

Various work items have been performed in respect of this. For example, with 3GPP Release-16 Work Item "Vertical and LAN Services", the 5G System (5GS) Bridge model was introduced. In this model, the 5G System is represented as time-sensitive-network (TSN) bridge towards the TSN network control and management system. TSN introduces additional mechanisms for traffic prioritization.

For example, by using "Enhancements for Scheduled Traffic" defined within IEEE 802.1Qbv, a bridge may be configured to be able to block an egress port for certain traffic classes. This may be useful in cases like the following example: If the bridge knows that at a certain point in time, a PCP 7 frame will arrive (or better, needs to leave the bridge), the bridge may block the corresponding egress port for traffic classes corresponding to PCP 0 . . . 6. This blocking enables an efficient and deterministic end-to-end latency in a bridged network. However, among other challenges, the blocking also requires detailed knowledge about the overall traffic in the network, in particular of individual devices and their traffic pattern as provided with the 802.1Qci extension. In other words, in order to provide ultra-low latencies and jitter-free communication, the 5GS Bridge is supposed to support both IEEE 802.1Qbv as well as IEEE 802.1Qci. However, it is likely that not all implementations of 5GS bridge will support the full set of protocols, e.g. they might neither support IEEE 802.1Qbv nor IEEE 802.1Qci.

Within a scheduled data allocation, the 3GPP network is capable of prioritizing traffic such that high-priority traffic is favoured, i.e., layer 2 frames with PCP 7 priority (highest priority) should be mapped to UL QoS flows with high-priority 5QI utilizing the QoS rules configured by the SMF in the terminal (QoS rules contain the QFI of the associated QoS Flow, a Packet Filter Set and a precedence value. Alternatively, such QoS rules may be pre-configured or derived by the terminal-reflective QoS). Knowing the QoS flow and its corresponding data radio bearer, the radio access network prioritizes the transmission of those frames in the radio access network in order to avoid that a low-priority (best-effort) frame is transmitted instead of a high-priority frame. Hence, in pre-defined intervals depending on the scheduled data-allocation, traffic arrives at the base station, which needs to be forwarded to the user plane function, and the traffic within each slot has already been prioritized.

Supporting IEEE 802.1Qbv and IEEE 802.1Qci (and other related IEEE 802.1Q-protocols) is not always beneficial. In cases where the 5GS bridge is operated standalone or integrated into non-TSN systems, not using IEEE 802.1Qbv/Qci and also IEEE 802.1Qbu information and/or protocols may cause a performance degradation of the 5GS Bridge due to the fact that a low-priority frame may be blocking the egress port while a high-priority frame needs to be transmitted.

Although the focus of the 3GPP "5GS Bridge" in release 16 was IEEE TSN including IEEE 802.1Qbv and 802.1Qci, it is not mandatory for the connected data network to support these standards. Early deployments may only utilize the capabilities of IEEE 802.1P (prioritization), IEEE 802.1AS (generalized Precision Time Protocol), and IEEE 802.1Qcc (Stream Reservation Protocol). These subsets will not allow for supporting isochronous applications, but they enable real-time communication guarantees. Furthermore, in Release 17 the 5GS support of fully distributed configuration model will be standardized which does not foresee the usage of IEEE802.1Qbv.

The present application describes techniques that may enable jitter-free communication without the transmission of a detailed traffic schedule as defined in IEEE 802.1Qbv/Qci, or to support the IEEE 802.1Qbu set of protocols. In other words, the present application describes techniques that may be used to reduce the amount of data transmitted and/or be compatible with bridges operating according to different communication protocols.

In particular, the present application looks to minimising and/or removing negative effects arising from when a low-priority frame at the user plane function (UPF) egress blocks the transmission of a high-priority frame, and from when low-priority frames cause head-of-line blocking within the backhaul network, i.e., between the radio access network (RAN) and the user plane function.

The presently described system also seeks to avoid imposing requirements on the backhaul interface and is intended to be applicable to networks supporting IEEE 802.1Qbv and to networks not supporting IEEE 802.1Qbv as well.

Throughout the following, for uplink traffic the user equipment/terminal is assumed to be configured (e.g., by a Policy Control Function (PCF)) with a mapping table between IEEE 802.1Q traffic classes and quality profiles for a 5G network (e.g. 5QI priorities). The terminal may inspect the PCP value in the header of an incoming frame, assign it to the correct traffic class, and then assign to the right PDU session and QoS flow with a 5QI Priority corresponding to the PCP/Traffic Class, respectively. Hence, a priority order imposed by a user equipment/terminal operating according to IEEE 802.1Q using PCP may be maintained within the 3GPP 5G QoS framework such that for instance PCP 7 frames can be transmitted using a QoS flow with high-priority 5QI.

The present application recognises that timing considerations applied to individual frames by a user equipment/terminal and by a radio access network when forwarding received data frames from the user equipment/terminals may be exploited to reduce latency for higher priority packets in an efficient manner.

Figure 4:
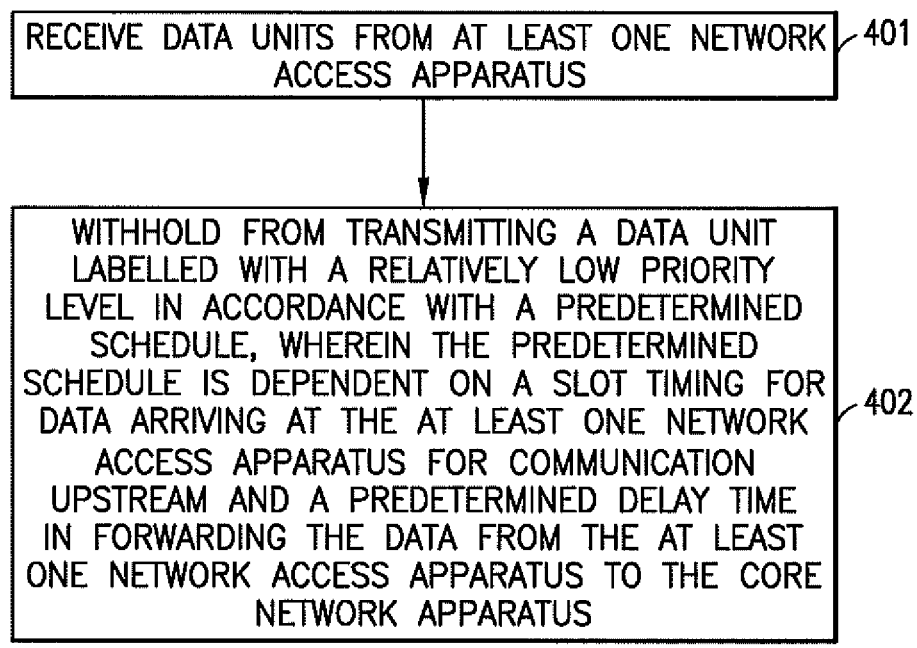
FIG. 4 is a flow chart of actions that may be performed by a core network apparatus.

A first example is discussed in relation to FIG. 4.

FIG. 4 is a flow chart illustrating possible actions performed by a core network apparatus, such as an apparatus performing actions associated with a user plane function (UPF).

At 401, the core network apparatus receives data units from at least one network access apparatus. The data units may be frames. Each data unit is labelled with a respective priority level. This means that one received data unit may have a different priority level to another received data unit, meaning that one received data unit may have a higher/lower priority to another priority level.

At 402, the core network apparatus withholds from transmitting a data unit labelled with a relatively low priority level in accordance with a predetermined schedule. The relatively low priority level may be the lowest priority level that can label a frame.

The predetermined schedule may be determined by the user plane function/the core network apparatus. The predetermined schedule may be determined by an entity other than the user plane function/the core network apparatus. For example, the predetermined schedule may be determined by a Session Management Function and communicated to the core network apparatus.

The predetermined schedule may be dependent on a slot timing for data arriving at the at least one network access apparatus for communication upstream and a predetermined delay time in forwarding the data from the at least one network access apparatus to the core network apparatus. The slot timing may refer to a scheduled, or predefined window of time in which data is expected to arrive, such as a time transmission interval. The slot timing may refer to the start of a slot/a window of time in which data is expected to arrive. The slot timing may be set by a specification defining an operating communication protocol (i.e. by a communication protocol adhered to by the present communication network). The slot timing may be global timing employed by the at least one network access apparatus (e.g. by multiple network access apparatuses providing terminals with access to the core network).

The predetermined delay time may comprise a fixed processing time of the at least one network apparatus in preparing received data for an uplink transmission.

The predetermined delay time may comprise (and/or further comprise) a transmission latency time representing a transmission delay between the core network apparatus and the at least one network apparatus, and a delay time representing a time between when a data unit is received by the core network apparatus and when the data unit is forwarded to an egress port of the core network apparatus.

The network apparatus may withhold/refrain from transmitting said data unit for a predetermined length of time. When no high priority data is received by the core network apparatus within the predetermined length of time, the core network apparatus may be configured to transmit said data unit immediately after the predetermined length of time has passed. When high priority data (i.e. data labelled with a relatively high priority, such as a highest labelled priority) is received by the core network apparatus within the predetermined length of time, the core network apparatus may be configured to continue withholding/refraining from transmitting said data unit immediately after the predetermined length of time has passed until after the high priority data has been transmitted.

The above describes a system in which a core network apparatus may be configured to apply a pattern of uplink slot duration in a radio access part of the network to a core network egress (e.g. the UPF egress) in order to schedule small time windows that are reserved for sending high priority traffic. This means that, in a system in which a radio access part of the network transmits data in slots, the timing employed for these radio access slots is utilised in a core network apparatus for withholding transmitting lower priority data.

The following considers this example in a specific 5G/3GPP case.

The present application recognises that a 3GPP system may perform an implicit traffic shaping by transmitting data in fixed-length slots. For instance, a 3GPP system using 15 kHz subcarrier spacing and scheduling 14 orthogonal frequency-division multiplexing (OFDM) symbols per slot, transmits data every 1 ms (the slot duration) during a transmission time interval (TTI). This slot duration length may vary in dependence on the subcarrier spacing and number of scheduled OFDM symbols per data allocation.

As a 3GPP radio access network applies OFDM, all base stations in the radio access network are synchronized in order to avoid inter-carrier interference caused by non-cyclic DFT applied to received symbols. This means that not only all base stations, but also all terminals assigned to one base station are synchronized such that their transmissions are received at the same time by the base station. This is achieved in 3GPP by applying a "Time Alignment" offset in order to outweigh effects arising from different distances over which network-accessing transmissions are made.

Based on this example, this means that all base stations in a radio access network receive a full slot in the uplink every 1 ms, which is then decoded, and data is forwarded to the core network. User plane traffic is forwarded to a user plane function, while Non-Access Stratum signalling is forwarded to other control plane entities. Therefore, the transmission of base stations to user plane functions is aligned in time, which causes an implicit traffic shaping.

Consequently, a user plane function may apply a pre-defined/predetermined pattern of egress gating that is derived from a duration of scheduled data allocation of the 3GPP radio access network, and a latency between the radio access network/Backhaul entities and the user plane function. This pre-defined pattern will cause, at the end of the previous slot-duration, the lower priority traffic to be transmitted before new data of higher priority arrives from the radio access network. This helps to avoid head-of-line blocking by low priority frames.

Since the user plane function, in the present case, supports traffic prioritization using PCP as defined in 802.1Q to queue data frames on the egress, the user plane function knows whether a high-priority frame is waiting for transmission or not. The user plane function may then refrain from transmitting data labelled as being low priority (e.g. by buffering and/or discarding low priority data) if such data cannot be transmitted before the new data of higher priority arrives from the radio access network. This means that at the beginning of the subsequent slot-duration, higher-priority data can be transmitted. The egress pattern may be configured by a Session Management Function independent of the external data network. This means that the described mechanism may be performed independently of the actual traffic volume and periodicity and independent of actual Time Sensitive Network streams.

This example is described with reference to FIGS. 5 and 6.

Figure 5:
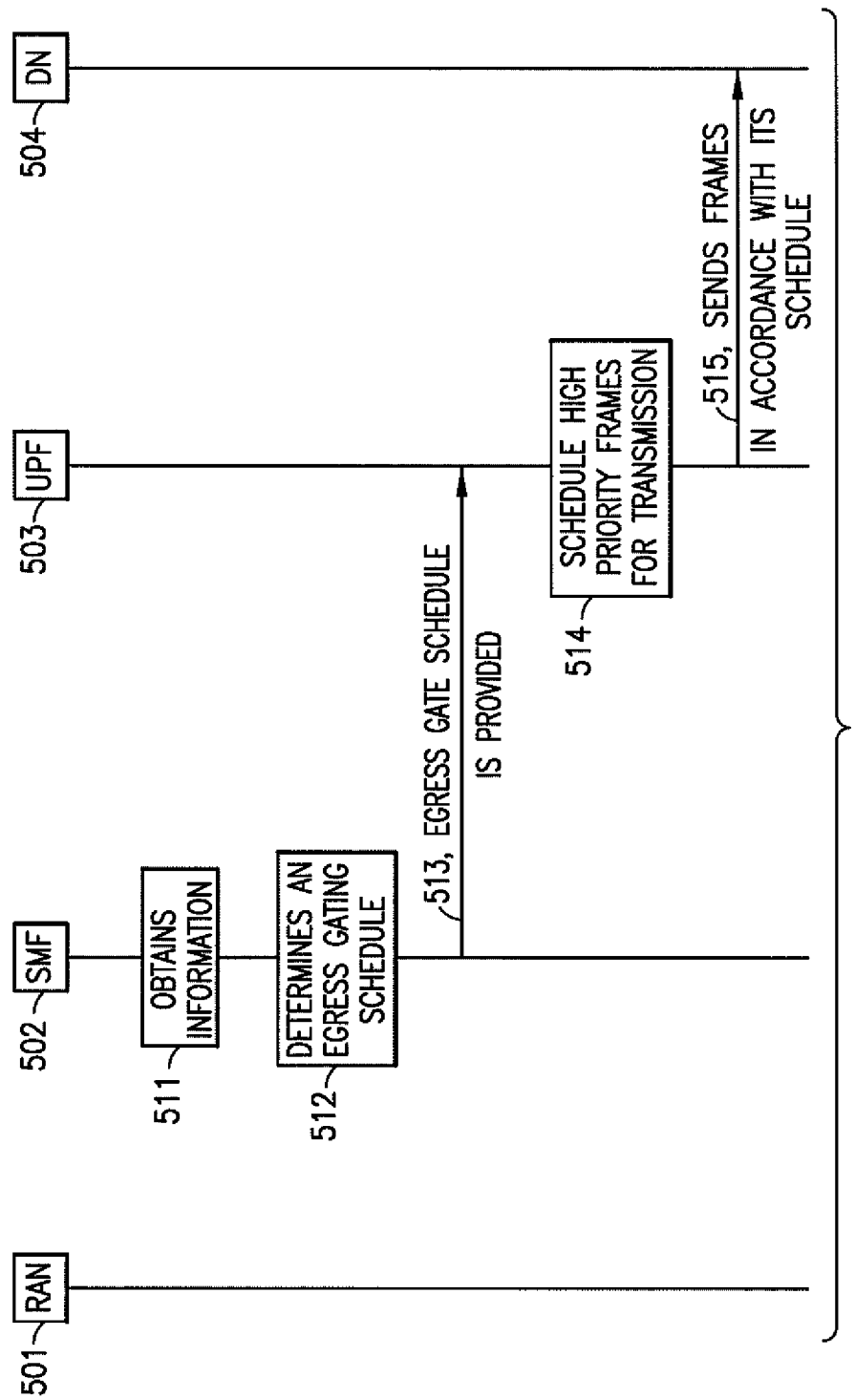
FIGS. 5 and 6 are signalling diagrams that illustrate potential actions of entities in a network.

FIG. 5 illustrates a signalling diagram with reference to a Radio Access Network 501, a Session Management Function 502, a User Plane Function 503 and a DN 504.

At 511, the SMF 502 obtains the following information.
1. A Global time at which gNBs in the radio access network 501 receive individual slots in uplink;
2. Processing delays in uplink according to TS 37.910, clause 5.7 associated with each gNB. These processing delays are assumed to be fixed. This is a reasonable assumption due to the fact that real-time processing platforms are used;
3. A core network part of PDB, comprising any of
   A backhaul latency (possibly negligible in local area backhaul networks) between the gNBs and the user plane function 503; and
   A residence time in the user plane function 503 before frames are forwarded to egress; and
4. An egress line speed in the user plane function 503 that indicates a time that the transmission of a frame on the egress takes.

At 512, the SMF 502 determines an egress gating schedule for the user plane function 503 directed towards ensuring that at the time when new data from a TTI arrives at the user plane function 503, the egress port of the user plane function 503 is reserved for high-priority traffic. This schedule may be derived by utilizing knowledge when TTIs are received at the gNB, then adding a time the gNB needs to process the received data (number 2, above), the backhaul latency from gNB to user plane function in order to derive when the TTI's data would arrive at the user plane function and the time it needs to process the data by the user plane function (number 3, above). This would determine when high-priority data may arrive at the user plane function's egress queue. In addition, the egress line speed (number 4, above) may be added to this value to determine a time it takes for a frame to be transmitted on the user plane function egress to make sure that it finishes transmission before a high-priority frame potentially arrives.

Based on the above information, the SMF can derive a gating at the user plane function egress port that reserves, at the beginning of a new slot, a small fraction of time for the transmission of high-priority traffic. This egress gate schedule is provided to the user plane function 503 at 513.

At 514, the user plane function 503 may schedule high priority frames for transmission within at least the small fraction of time defined by the egress gating.

At 515, the user plane function 503 sends frames to the DN 504 in accordance with its schedule.

Generally, high-priority frames may be sent in each and every radio uplink slot. However, in the case that the terminal does not send high-priority frames (meaning that no such frames are received by the user plane function), low-priority frames may be transmitted as soon as the reserved period is over.

In this described specific case, the user plane function may use 802.1Q-2018 queueing on the egress. This means that it can check the different queues and verify whether a high-priority frame is waiting for transmission or not. The length of the reserved time may be independent of the actual payload but only serves the purpose of avoiding that a low-priority frame blocks the egress when a new data arrives. Using this method, no frame pre-emption support is required and only a marginal amount of best-effort traffic is traded-off for achieving very low jitter communication.

The above approach may also be applied when the actual traffic pattern is known. In this case, the SMF may provide a corresponding TSCAI (time-sensitive communication assistance information) to the radio access network, which responds by enforcing corresponding configured grants (CGs). A configured grant is a mechanism that was introduced in order to lower a latency caused by radio resource scheduling mechanism in which the UE when it has data to transmit first needs to send the scheduling request and receives a grant for needed resources. A configured grant allocates radio resources, e.g. for periodic data transmission in advance of a request for radio resources, such that a scheduling request procedure is eliminated along with the delay resulting from a scheduling request procedure. The configured grant mechanism for the NG-RAN is provided in 3GPP TS 38.300.

The arrival of high-priority traffic at the user plane function can be calculated as described by the above method. This example has the advantage that the user plane function egress gating only needs to be done for a reduced number of slot-durations.

Figure 6:
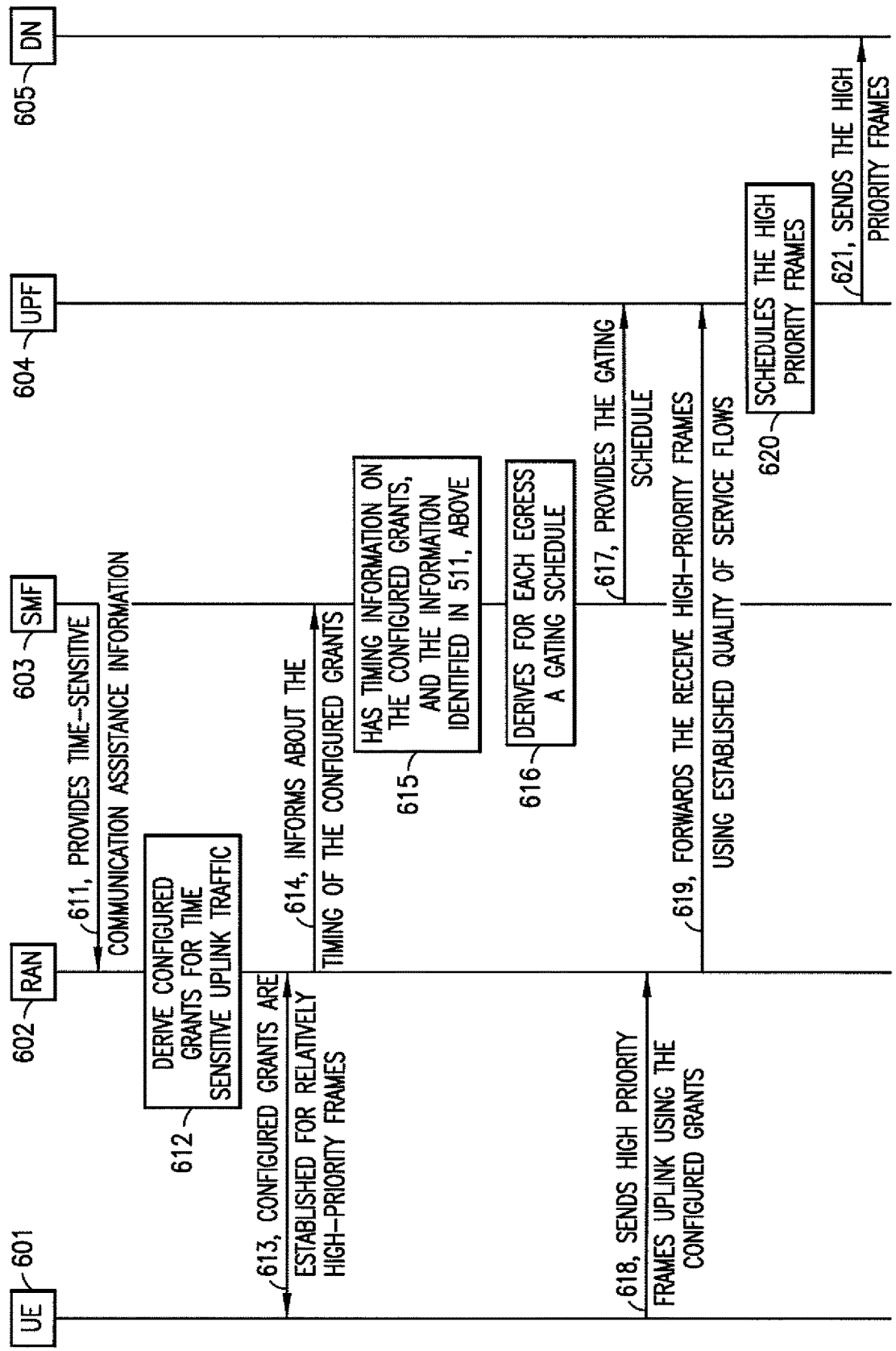

FIG. 6 is a flowchart illustrating this example.

FIG. 6 illustrates a user equipment/terminal 601, a radio access network entity 602, an SMF 603, a user plane function 604 and a DN 605.

At 611, the SMF 603 provides time-sensitive communication assistance information to radio access network 602.

At 612, the radio access network 602 uses this received information to derive Configured Grants for time sensitive uplink traffic from the terminal 601.

At 613, Configured grants are established for relatively high-priority frames.

At 614, the radio access network 602 informs SMF 603 about the timing of the configured grants.

At 615, the SMF 603 has timing information on the configured grants, and the information identified in 511, above.

At 616, the SMF 603 derives, for each egress port/for each UPF 604, a gating schedule. This gating schedule may be determined based on any of the following information:
   a) Uplink TSC flows associated with the egress port being considered (potentially for multiple terminals);
   b) A configured grant schedule for each of the selected flows
   c) A frame arrival time at user plane function 604 egress port based on the timing of each configured grant, a time transmission interval, a gNB processing delay, and a core network part of the delay A calculated frame arrival time may be used to compute a time window to be reserved for high-priority frames, as per the example in FIG. 5.

At 617, the SMF 603 provides the gating schedule to the user plane function 604.

At 618, the terminal sends high priority frames uplink to radio access network 602 using the configured grants.

At 619, the radio access network 602 forwards the receive high-priority frames to the user plane function 604 using established Quality of Service flows.

At 620, the user plane function 604 schedules the high priority frames to the DN 605 according to the reserved egress gate time window.

At 621, the user plane function 604 sends the high priority frames to the DN 605 according to the reserved egress gate time window It is understood that, in the above example, the gating may be implemented directly by the user plane function by buffering low-priority frames that cannot be delivered on the egress in time before new data arrives. This may be known as implicit gating. The actual timing periodicity and arrival time of a TTI's data, as well as the gating window may be configured by the SMF.

It is also understood in the above that the user plane function configuration performed by the SMF may utilize 5QI priorities. Thus, the user plane function may perform a check that PDUs with lower 5QI priorities are not delivered towards the DN (aka egress) if the user plane function cannot guarantee that it is delivered before new data arrives, i.e., when the next slot-duration at user plane function egress begins. It is assumed that high-priority traffic is not distributed across multiple TTIs, i.e., segmented, in order to fulfil the latency requirements.

Changes may also be made to a radio access network entity in order to achieve the present objectives.

For example, a traffic prioritization applied in radio access network on the interface between the radio access network and the terminal may be utilized in order to maintain the same prioritization in the backhaul. This may be done either by directly using a received payload's data link layer prioritisation, such as a PCP code, or by using the 5QI priorities applied to the NG Data Link Layer.

Figure 7:
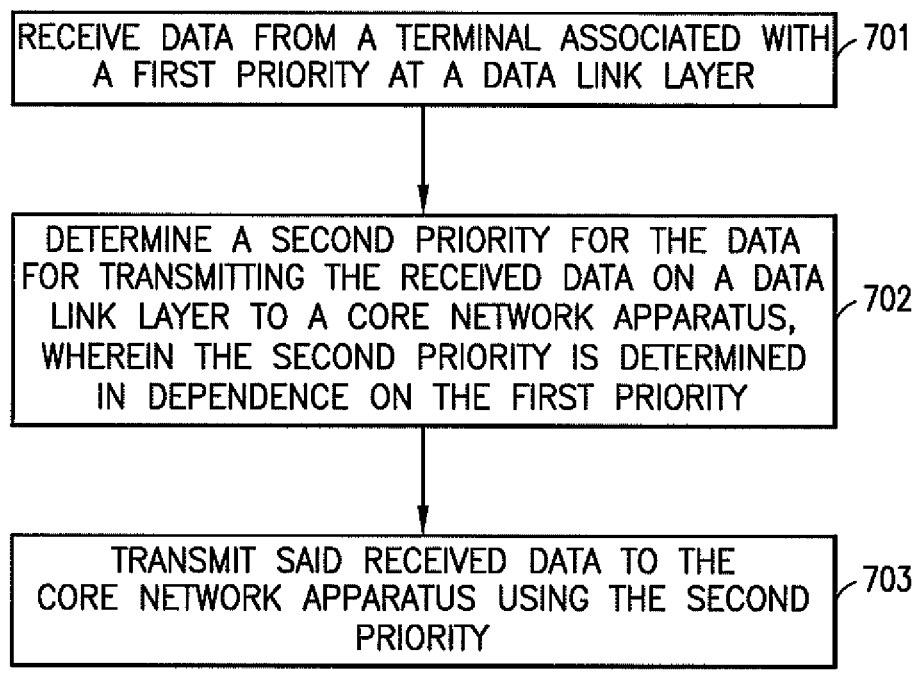
FIG. 7 is a flow chart of actions that may be performed by a network access apparatus.

This is discussed in relation to FIG. 7, which illustrates a flow chart comprising various actions that may be performed by a network access entity, such as a gNB.

At 701, the network access entity receives data from a terminal. The received data is associated with a first priority at a data link layer. For example, the received data may be labelled/tagged with the first priority through a PCP code level. The received data may be associated with a 5QI priority.

At 702, the network access entity determines a second priority for the data on a data link layer for transmitting said data to a core network apparatus. The second priority may be determined in dependence on the first priority.

At 703, the network access entity may transmit said received data to the core network apparatus using the second priority. The second priority is used to label the received data on the data link layer between the network access entity and the core network apparatus.

This idea is further illustrated in respect of the following specific example.

In TS 38.414, it is described how an Operations, Administration and Maintenance function may pre-configure rules that map traffic to different types of data packets for transmitting uplink data from the radio access network to a user plane function. For example, DiffServ is a mechanism for traffic management that uses DiffServ code points to distinguish between different types of traffic. Mapping between traffic and a type of data packet may be based on at least one of 5QI, priority level, and/or other NG-RAN traffic parameters. However, DiffServ is a Layer 3 technology and would not apply to Layer 2 forwarding in a local area backhaul.

Hence, the following examples may be applied with the aim of ensuring that the prioritization of traffic is maintained in the transport network:

As a first example, when the data link level payload utilizes PCP, PCP categorisation (e.g. PCP code levels) may be directly applied to and reused on the layer 2/data link layer backhaul to indicate a priority of transmitted data.

As a second example, the Operations, Administration and Maintenance function may pre-configure a mapping table for mapping a payload PCP code to layer 2 backhaul network priorities.

As a third example, the Operations, Administration and Maintenance function may pre-configure a mapping table for mapping 5QI associated with received data to layer 2 backhaul network priorities.

Another change that may be made at the radio access network level is for a network access entity (such as a gNB) to intentionally introduce a delay on the backhaul interface when forwarding received data to the User Plane Function. The function of these delays would be to cause an order of data transmissions that matches the data priority.

In other words, a network access apparatus such as a gNB may introduce an intentional traffic-class-specific delay on transmissions when forwarding data from the network access apparatus to the User Plane Function in order to compensate for different latencies experienced (or expected to be experienced) in the backhaul link between the network access apparatus and the User Plane Function. According to some specific simulations run, these delays are expected to be rather low, e.g., at a difference of distance of 100 m, the delay difference would be in the order of 300 ns. This ensures that the order of data transmissions matches the data priority, i.e. higher priority traffic is transmitted before lower priority traffic. This simulation assumed that at least 1 Gbps Ethernet is used and in this case, already a delay of about 1.2 μs could already outweigh the transmission time used for 200B.

The delay introduced by the network access apparatus may be configured by the Access Management Function and/or the Session Management Function using knowledge of the expected traffic in the network. The actual delay introduced to different 5QI and/or PCP codes/traffic classes may be configured via the Operations, Administration and Maintenance function. The expected traffic in the network may be determined as bridges may be pre-configured for specific VLANs and traffic classes.

Introducing a delay may help mitigate against an additional source of jitter via Head of Line blocking in the backhaul link. This blocking may occur, as discussed above, when low-priority frames are currently being transmitted on an egress port and a higher-priority frame arrives and is supposed to be transmitted on the same egress port. In this case, it may happen that either the backhaul latency of this gNB or its transmission time (frame length) is sufficiently lower than of higher-priority frames transmitted by other gNBs.

In the above, reference is made to frames. A frame is data encapsulated by a framing protocol. Example frames include Ethernet frames, Point-to-Point Protocol frames, Fibre Channel frames and V.42 modem frames. A frame may be thought of as a protocol data unit at the data link layer.

It should be understood that each block of the flowchart of the Figures and any combination thereof may be implemented by various means or their combinations, such as hardware, software, firmware, one or more processors and/or circuitry.

It is noted that whilst examples have been described in relation to one example of a standalone 5G, similar principles maybe applied in relation to other examples of standalone 3G, LTE or 5G networks. It should be noted that other examples may be based on other cellular technology other than LTE, NR or on variants of both. Therefore, although certain examples were described above by way of example with reference to certain example architectures for wireless networks, technologies and standards, examples may be applied to any other suitable forms of communication systems than those illustrated and described herein.

It is also noted herein that while the above describes examples, there are several variations and modifications which may be made to the disclosed solution without departing from the scope of the present claims.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

In general, the various examples may be implemented in hardware or special purpose circuits, software, logic or any combination thereof. Some aspects of the described may be implemented in hardware, while other aspects may be implemented in firmware or software which may be executed by a controller, microprocessor or other computing device, although the claimed is not limited thereto. While various aspects of the claimed may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The examples of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out examples. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Examples of the above disclosures may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary example of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of the appended claims.

The invention claimed is:

1. A core network apparatus comprising
at least one processor, and
at least one non-transitory memory storing instructions, that when executed by the at least one processor, cause the core network apparatus to:
receive data units from at least one network access apparatus,
wherein each data unit is labelled with a respective priority level; and
withhold from transmitting a data unit labelled with a relatively low priority level in accordance with a predetermined schedule,
wherein the predetermined schedule is based on
a slot timing for data arriving at the at least one network access apparatus for communication upstream, and
a predetermined delay time in forwarding the data from the at least one network access apparatus to the core network apparatus.

2. The core network apparatus of claim 1, wherein the at least one non-transitory memory stores instructions, that when executed by the at least one processor, further cause the core network apparatus to:
receive the predetermined schedule from a control plane function.

3. The core network apparatus of claim 2,
wherein the control plane function is a session management function.

4. The core network apparatus of claim 1,
wherein the predetermined delay time comprises:
a transmission latency time representing a transmission delay between the core network apparatus and the at least one network access apparatus, and
a delay time representing a time between when a data unit is received by the core network apparatus and when the data unit is forwarded to an egress port of the core network apparatus.

5. The core network apparatus of claim 1, wherein the at least one non-transitory memory stores instructions, that when executed by the at least one processor, further cause the core network apparatus to:
determine the predetermined schedule based on a configured uplink grant of at least one network access apparatus for transmitting high priority data from a terminal to said at least one network access apparatus.

6. The core network apparatus of claim 1, wherein the at least one non-transitory memory stores instructions, that when executed by the at least one processor, further cause the core network apparatus to:
transmit a data unit labelled with a relatively high priority level simultaneous to withholding from transmitting said data unit labelled with a relatively low priority level in accordance with the predetermined schedule.

7. The core network apparatus of claim 1, wherein the at least one non-transitory memory stores instructions, that when executed by the at least one processor, further cause the core network apparatus to:
transmit said data unit labelled with a relatively low priority level immediately after a predetermined length of time has passed, based on a determination that no high priority data is received by the core network apparatus within the predetermined length of time.

8. The core network apparatus of claim 1,
wherein the predetermined delay time comprises a fixed processing time of the at least one network access apparatus for processing an uplink transmission of the received data.

9. The core network apparatus of claim 1,
wherein the slot timing is based on a global timing employed with the at least one network access apparatus.

10. A core network apparatus of claim 1, wherein the at least one non-transitory memory stores instructions, that when executed by the at least one processor, further cause the core network apparatus to:
continue to withhold transmitting said data unit labelled with a relatively low priority level until at after the high priority data has been transmitted by the core network apparatus, based on a determination that high priority data is received by the core network apparatus within a predetermined length of time.

11. A network apparatus comprising
at least one processor, and
at least one non-transitory memory storing instructions, that when executed by the at least one processor, cause the network apparatus to:
determine a predetermined schedule for a core network apparatus for withholding from transmitting a data unit labelled with a relatively low priority level,
wherein the predetermined schedule is based on
a slot timing for data arriving at least one network access apparatus for communication upstream, and
a predetermined delay time in forwarding the data from the at least one network access apparatus to the core network apparatus; and
provide the predetermined schedule to the core network apparatus.

12. The network apparatus of claim 11, wherein the predetermined delay time comprises:
a transmission latency time representing a transmission delay between the core network apparatus and the at least one network access apparatus, and
a delay time representing a time between when a data unit is received by the core network apparatus and when the data unit is forwarded to an egress port of the core network apparatus.

13. The network apparatus of claim 11, wherein the at least one non-transitory memory stores instructions, that when executed by the at least one processor, cause the network apparatus to:
determine the predetermined schedule based on a configured uplink grant of at least one network access apparatus for transmitting high priority data from a terminal to said at least one network access apparatus.

14. The network apparatus of claim 11,
wherein the slot timing is based on a global timing employed with the at least one network access apparatus.

15. A method for a core network apparatus, the method comprising:

receiving data units from at least one network access apparatus, wherein each data unit is labelled with a respective priority level; and withholding from transmitting a data unit labelled with a relatively low priority level in accordance with a predetermined schedule, wherein the predetermined schedule is based on a slot timing for data arriving at the at least one network access apparatus for communication upstream, and a predetermined delay time in forwarding the data from the at least one network access apparatus to the core network apparatus.

16. A method as claimed in claim 15, wherein the predetermined delay time comprises:

a transmission latency time representing a transmission delay between the core network apparatus and the at least one network access apparatus, and a delay time representing a time between when a data unit is received by the core network apparatus and when the data unit is forwarded to an egress port of the core network apparatus.

17. The method of claim 15, further comprising:

determining the schedule in dependence on a configured uplink grant of at least one network access apparatus for transmitting high priority data from a terminal to said at least one network access apparatus.

18. The method as claimed in claim 15, further comprising:

transmitting a data unit labelled with a relatively high priority level simultaneous to withholding from transmitting said data unit labelled with a relatively low priority level in accordance with the predetermined schedule.

19. The method as claimed in claim 15, further comprising:

transmitting said data unit labelled with a relatively low priority level after a predetermined length of time has passed, based on a determination that no high priority data is received by the core network apparatus within the predetermined length of time.

20. The method as claimed in claim 15, further comprising:

continuing to withhold transmitting said data unit labelled with a relatively low priority level until at after the high priority data has been transmitted, based on a determination that high priority data is received by the core network apparatus within a predetermined length of time.

* * * * *